(12) United States Patent
Richert et al.

(10) Patent No.: US 7,479,712 B2
(45) Date of Patent: Jan. 20, 2009

(54) CONFIGURATION FOR N CONSUMERS OF ELECTRIC ENERGY, OF WHICH M CONSUMERS ARE SIMULTANEOUSLY SUPPLIED WITH ENERGY

(75) Inventors: Holger Richert, Bruchkoebel (DE); Wolfgang Morbe, Hanau (DE)

(73) Assignee: Applied Materials GmbH & Co. KG., Alzenau (DE)

( * ) Notice: Subject to any disclaimer, the term of this patent is extended or adjusted under 35 U.S.C. 154(b) by 418 days.

(21) Appl. No.: 10/694,530

(22) Filed: Oct. 27, 2003

(65) Prior Publication Data

US 2005/0052803 A1 Mar. 10, 2005

(30) Foreign Application Priority Data

Sep. 10, 2003 (DE) .............. 103 41 717

(51) Int. Cl.
*H02M 1/10* (2006.01)
(52) U.S. Cl. .......................... 307/29; 307/38
(58) Field of Classification Search ............... 361/82, 361/29, 38; 307/29
See application file for complete search history.

(56) References Cited

U.S. PATENT DOCUMENTS

| | | | |
|---|---|---|---|
| 4,200,805 A | 4/1980 | Le Francois | |
| 4,788,449 A * | 11/1988 | Katz | ............ 307/43 |
| 4,902,394 A | 2/1990 | Kenmotsu et al. | |
| 5,429,705 A * | 7/1995 | Mahler et al. | ......... 156/345.43 |
| 5,444,333 A * | 8/1995 | Lau | ............ 315/94 |
| 5,584,974 A * | 12/1996 | Sellers | ............ 204/192.13 |
| 5,625,546 A | 4/1997 | Schaal | |
| 5,914,585 A | 6/1999 | Grabon | |
| 6,297,610 B1 * | 10/2001 | Bauer et al. | ............ 318/562 |
| 6,420,863 B1 * | 7/2002 | Milde et al. | ............ 324/76.76 |
| 6,448,672 B1 | 9/2002 | Voegeli et al. | |
| 6,511,584 B1 | 1/2003 | Szczyrbowski et al. | |
| 6,621,674 B1 | 9/2003 | Zahringer et al. | |
| 6,625,736 B1 * | 9/2003 | Berthaud et al. | ............ 713/300 |
| 2003/0168913 A1 * | 9/2003 | Kinnard | ............ 307/29 |

FOREIGN PATENT DOCUMENTS

| | | |
|---|---|---|
| DE | 28 11 942 A1 | 10/1978 |
| DE | 195 40 255 | 4/1997 |
| DE | 196 10 012 A1 | 9/1997 |
| DE | 196 51 811 A1 | 6/1998 |
| EP | 0 230 652 A1 | 8/1987 |

(Continued)

OTHER PUBLICATIONS

Heuck, et al., Elektrische Energieversorgung, (1983), pp. 172-175, and 276-279.

*Primary Examiner*—Stephen W Jackson
*Assistant Examiner*—Scott Bauer
(74) *Attorney, Agent, or Firm*—Fulbright & Jaworski LLP

(57) ABSTRACT

The invention relates to a configuration for several consumers of electric energy, with these consumers having either the same electric power or different electric powers. Since, as a rule, not all consumers need to be supplied simultaneously with electric energy, for example if, due to maintenance work, some are not in operation, a modular energy supply system is provided, which is comprised of several interconnectable modules. This makes it possible for each consumer to be supplied from small units with the power it requires.

12 Claims, 2 Drawing Sheets

FOREIGN PATENT DOCUMENTS

| | | |
|---|---|---|
| EP | 0 703 652 B1 | 3/1996 |
| EP | 1263108 A1 | 12/2002 |
| JP | 58-003976 | 1/1983 |
| JP | 63-183168 | 7/1988 |
| JP | 9056064 | 2/1997 |
| JP | 9204240 | 8/1997 |
| JP | 2002-004033 | 1/2002 |
| JP | 2002-363740 | 12/2002 |
| WO | WO-01/13402 A1 | 2/2001 |
| WO | WO-03/041206 A1 | 5/2003 |

* cited by examiner

CONFIGURATION FOR N CONSUMERS OF ELECTRIC ENERGY, OF WHICH M CONSUMERS ARE SIMULTANEOUSLY SUPPLIED WITH ENERGY

FIELD OF THE INVENTION

The invention relates to a configuration for N consumers of electric energy, of which M consumers are simultaneously supplied with energy.

BACKGROUND AND SUMMARY OF THE INVENTION

In industrial installations often several electric facilities are required of which, however, not all are simultaneously in operation.

For example coating installations often consist of several sputter devices in order to apply differing coatings, for example, onto glass. In this installation each sputter device has its own energy supply, which can be a DC or an AC energy supply.

The electric powers, with which the sputter devices operate, differ. They can be 15 kW but also 180 kW. If, for example, fifteen sputter devices are assumed with the powers 180 kW (AC), 30 kW (DC), 75 kW (DC), 30 kW (DC), 30 kW (DC), 120 kW (DC), 120 kW (AC), 120 kW (AC), 75 kW (DC), 120 kW (DC), 30 kW (DC), 30 kW (DC), 120 kW (DC), 120 kW (AC), 120 kW (AC), a total AC power of 660 kW and a total DC power to be provided of also 660 kW is calculated. Per kilowatt of power an electric power supply currently costs approximately €700.00, which amounts to a total power supply cost of €924,000.00.

In practice, of the overall 1320 kW only relatively few kW are called up, since not all sputter installations are operating simultaneously. As a rule, a total DC power of 300 kW is sufficient.

The invention therefore addresses the problem of making available only as much electric power as is actually required.

This problem is solved according to the present invention, which consequently relates to a configuration for several consumers of electric energy, where these consumers have either the same electric power or different electric power requirements. Since, as a rule, not all consumers need to be supplied simultaneously with electric energy, for example if some are not in operation due to maintenance work, a modular energy supply system is provided, which comprises several modules which can be interconnected. Hereby each consumer can be supplied from small units with that power which is required.

The advantage attained with the invention comprises in particular that expenditures for expensive electric energy supplies are saved.

An embodiment example of the invention is shown in the drawing and will be described below in further detail.

DETAILED DESCRIPTION

Figure 1:
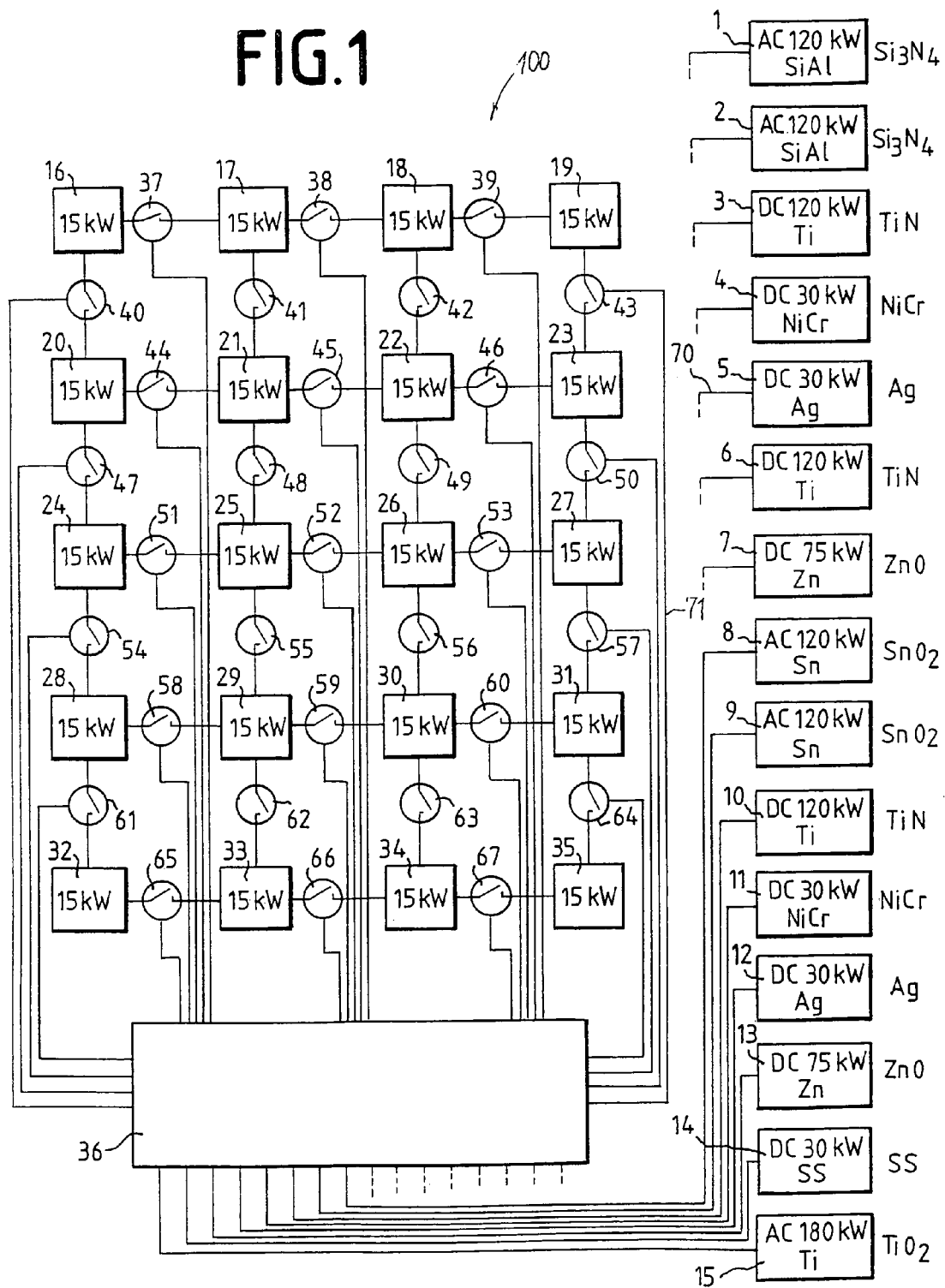
FIG. 1 is a basic representation of a modular energy supply.

In FIG. 1 several sputter installations 1 to 15 are schematically depicted as boxes, which are disposed for example in a hall one behind the other. Through these sputter installations 1 to 15 pass, for example, glass disks to be coated, which are provided with one or several layers. The particular electric connection power of these sputter installations 1 to 15 is shown within a box as well as the material of a target to be sputtered. The layer, which is generated with the sputtered material on a substrate, is depicted on the right next to the sputter installations 1 to 15.

In conventional sputter installations each installation has its own current supply, which can make available the powers required in each instance.

According to the invention the electric power for all sputter installations 1 to 15 is produced through a modular energy supply 100, which, for example, comprises twenty individual energy supplies 16 to 35 each of 15 kW, which in the example are all DC power supplies. It is here assumed that not all sputter installations 1 to 15 are in operation simultaneously, but rather at a definite time, for example, only the installations 5, 7, 10 and 13. These installations require a total of 300 kW. These 300 kW can be produced through suitable interconnections of the individual energy supplies 16 to 35, for 20×15 kW=300 kW. The interconnection herein takes place by means of a control 36, which, by means of control line and via switches 37 to 67, links several individual energy supplies 16 to 35 with one another.

The sputter installation 5 requires 30 kW, such that the interconnection, for example of individual energy supplies 19 and 23 or 18 and 19, etc. is sufficient.

If the sputter installation 5 is switched on, a report back via a line 70 to the control 36 can take place, which subsequently is informed that for the sputter arrangement 5 thirty kW must be made available. It then links, for example by means of a control command, the two individual energy supplies 19 and 23 via a line 71 and via the switch 43. If the line 71 is developed as a control and energy line, the interconnected power can be looped through the control 36 and be supplied to the sputter installation 5 via line 70.

As before, regulation of the sputter voltages in the arrangement according to FIG. 1 is carried out decentrally, i.e. each sputter installation has its own regulation, whose task, inter alia, it is to prevent arcing. The so-called arc management consequently remains associated with each individual sputter installation 1 to 15 or their cathodes. In the case of AC current operation, to each cathode an adaptation network must be assigned. If the sputter cathodes are operated with pulsed DC, each cathode, in addition to an arc management of its own, is also connected to a pulse generator. If double cathodes are employed, one pole-reversal unit is assigned to two cathodes.

Figure 2:
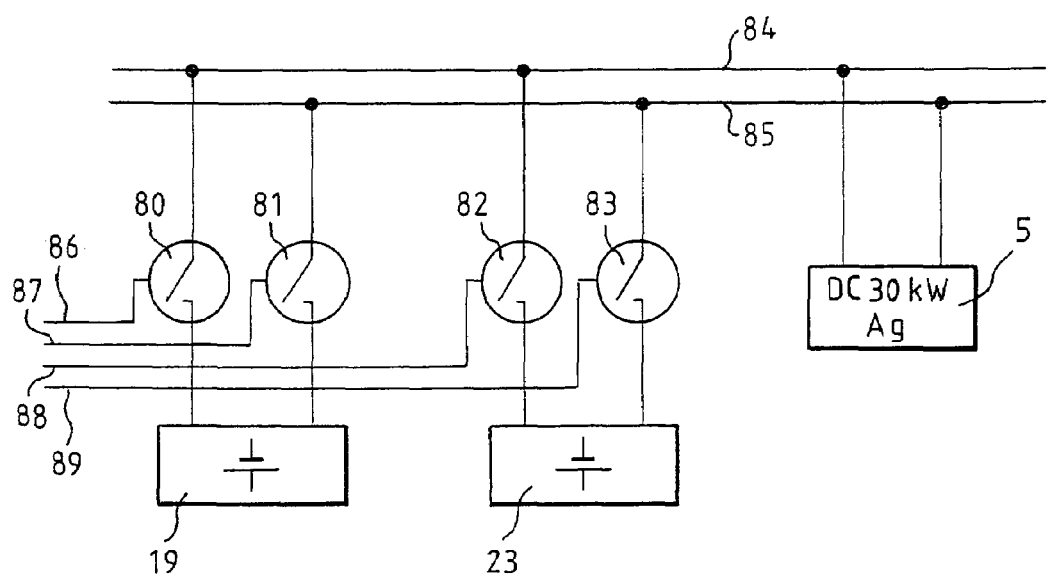
FIG. 2 shows a double-pole switching circuit of energy supply sources to supply lines.

In FIG. 2 the switching circuit of two individual energy supplies 19, 23 is depicted once more as double-poled. Here again the sputter installation 5 is evident, which must be supplied with 30 kW. For this purpose the two individual energy supplies 19, 23 are connected to supply lines 84, 85 via switches 80, 81 or 82, 83. The control lines 86 to 89 and supply lines 84, 85 can be carried in a single cable to control 36. However, it is also possible to carry both line types separately.

The arc management, the adaptation network and the circuits necessary for the pulse operation can be disposed directly at the cathodes or in their proximity.

The present invention permits considerable cost savings. Since only a total power of 300 kW is made available, the costs for the power supply amounts now only to €210,000.00 instead of €924,000.00. The linkage circuitry among the individual energy modules can be produced cost-effectively so that the total costs are considerably reduced. Thereby that to each cathode in sputter installations always a separate regulation and/or adaptation unit must still be assigned, the total savings of the power supply is approximately 30 to 40% compared to conventional techniques.

With the invention many cathodes of a vacuum installation can be connected to the power supplies 16 to 35 in the described manner. However, it is also possible to connect several vacuum installations, which have only one or few cathodes, to the modular energy supply 100.

It is understood that the sputter installations 1 to 15 can all have the same power data. If, for example, many coating installations of the same type are located in a production hall and if some installations, for example due to maintenance or revision, are not in operation so that the actual capacity utilization is approximately 80%, the required power can be switched with the modularly structured power supply 100 to the installations which are in operation. The installations in stand-down condition in this case would not be connected to the power supply.

The invention has been described in conjunction with an embodiment example, which relates to sputter installations. However, it can be applied with all coating installations and, even more generally, with all power consumers.

It is claimed:

1. A configuration for n consumers of electric energy, of which m consumers are supplied simultaneously with energy, wherein at any time m<n, and whereby a modular energy supply comprising k energy modules is provided, and whereby the sum of the power supplyable by the k energy modules is smaller than the power which would be necessary, if all n consumers simultaneously required electrical power, wherein a control is provide which connects as many energy modules to respective one of the m consumers so that this consumer receives the power required by said consumer.

2. The configuration as claimed in claim 1, wherein that the consumers are sputter installations, with each cathode of a sputter installation having its own arc management.

3. The configuration as claimed in claim 1, wherein the electric energy is realized by DC current.

4. The configuration as claimed in claim 1, wherein the electric energy is realized by AC current.

5. The configuration as claimed in claim 1, wherein the electric energy is realized by pulsed DC current.

6. The configuration as claimed in claim 2, wherein each cathode is provided with its own adaptation network.

7. The configuration as claimed in claim 3, wherein each cathode is provided with its own adaptation network.

8. The configuration as claimed in claim 4, wherein each cathode is provided with its own adaptation network.

9. The configuration as claimed in claim 1, wherein the consumers are sputter installations with each installation including two cathodes to which one pole reversal unit is assigned.

10. The configuration as claimed in claim 1, wherein the consumers are sputter installations with each installation including two cathodes, of which the one cathode is connected to a pole of an AC voltage and the other cathode to the other pole of this AC voltage.

11. The configuration as claimed in claim 2, wherein a pulse generator is assigned to each cathode.

12. The configuration of claim 1, wherein each of the k energy modules have the same electrical power.

* * * * *